(12) United States Patent
Chambliss et al.

(10) Patent No.: US 9,280,551 B2
(45) Date of Patent: Mar. 8, 2016

(54) DE-DUPLICATION DEPLOYMENT PLANNING

(71) Applicant: International Business Machines Corporation, Armonk, NY (US)

(72) Inventors: David D. Chambliss, Morgan Hill, CA (US); Mihail C. Constantinescu, San Jose, CA (US); Joseph S. Glider, Palo Alto, CA (US); Maohua Lu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 13/908,955

(22) Filed: Jun. 3, 2013

(65) Prior Publication Data

US 2014/0358867 A1    Dec. 4, 2014

(51) Int. Cl.
    *G06F 17/30* (2006.01)
(52) U.S. Cl.
    CPC .................. *G06F 17/30156* (2013.01)
(58) Field of Classification Search
    CPC .................................. G06F 17/30067
    USPC .......................................... 707/692
    See application file for complete search history.

(56) References Cited

U.S. PATENT DOCUMENTS

| | | | |
|---|---|---|---|
| 5,990,810 A | 11/1999 | Williams | |
| 7,814,129 B2 | 10/2010 | Williams | |
| 8,086,799 B2 | 12/2011 | Mondal et al. | |
| 8,204,866 B2 | 6/2012 | Chaudhuri et al. | |
| 8,209,334 B1 | 6/2012 | Doerner | |
| 8,280,926 B2 | 10/2012 | Sandorfi et al. | |
| 8,285,681 B2 | 10/2012 | Prahlad et al. | |
| 8,315,986 B1 * | 11/2012 | Kapoor et al. | 707/679 |
| 2010/0153375 A1 * | 6/2010 | Bilas et al. | 707/723 |
| 2010/0332452 A1 | 12/2010 | Hsu et al. | |
| 2011/0099351 A1 | 4/2011 | Condict | |
| 2011/0173197 A1 | 7/2011 | Mehta et al. | |
| 2011/0302163 A1 | 12/2011 | Rhinelander et al. | |
| 2012/0023112 A1 | 1/2012 | Levow et al. | |
| 2014/0114933 A1 * | 4/2014 | Chandrasekarasastry et al. | 707/692 |

OTHER PUBLICATIONS

Lu et al., Insights for Data Reduction in Primary Storage: A Practical Analysis, Proceedings of the 5th Annual International Systems and Storage Conference, ACM, Jun. 4, 2012.
Lu et al., Content Sharing Graphs for Deduplication-Enabled Storage Systems, Algorithms 2012, 5, 236-260, Apr. 2012.

* cited by examiner

*Primary Examiner* — Rehana Perveen
*Assistant Examiner* — Hicham Skhoun
(74) *Attorney, Agent, or Firm* — Lieberman & Brandsdorfer, LLC

(57) ABSTRACT

Assignment of files to a de-duplication domain. Address space of data files is divided into multiple containers. For each of the containers, a file metadata scan is performed to obtain file system metadata, which is aggregated and summarized in a content feature summary. A content feature summary prediction measurement is measured between containers from the generated content feature summary, and files from each container are assigned to a de-duplication domain based upon the content similarity predication measurement.

20 Claims, 7 Drawing Sheets

DE-DUPLICATION DEPLOYMENT PLANNING

BACKGROUND

The present invention relates to increased efficiency of data de-duplication. More specifically, the invention relates to selecting data containers for placement into a de-duplication domain.

De-duplication is a method to reduce the number of data storage devices that need to be used to store a given amount of information. It operates by detecting repetition of identical chunks of data, and in some instances replacing a repeated copy with a reference to another copy of the same content. A de-duplication system also provides for reconstructing the original form of content which has been stored in a compressed manner. References are used to locate the original copies of the data so that the full-length form of the desired content can be delivered.

Systems employing de-duplication can experience performance issues when applied to large-scale storage systems. To resolve this issue, systems built for large-scale storage are generally designed to adopt a scale-out strategy such that separate hardware can operate independently on separate sub regions of the storage. Operating independently is necessary so that messaging overheads, lock delays, and blocking waits do not grow too large. However, de-duplication imposes a limitation for a dependent operation across its entire span. This limitation creates a requirement that all nodes involved in the full span of de-duplication be in frequent messaging contact and block waits that can degrade scalability.

BRIEF SUMMARY

This invention comprises a system and article for assigning data containers to a de-duplication domain.

In one aspect, a computer program product and system are provided for assigning files from containers to a de-duplication domain. An address space of data is divided into multiple containers and a file metadata scan of each container is performed. The file metadata scan obtains file system metadata for all files utilizing each of the containers. The file metadata is aggregated into characterizations for each metadata dimension, and a content feature summary is generated for each container. Content similarity predication is measured between containers from the generated content feature summary. Files are assigned from each container to a de-duplication domain based on the measured content similarity prediction.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

Figure 1:
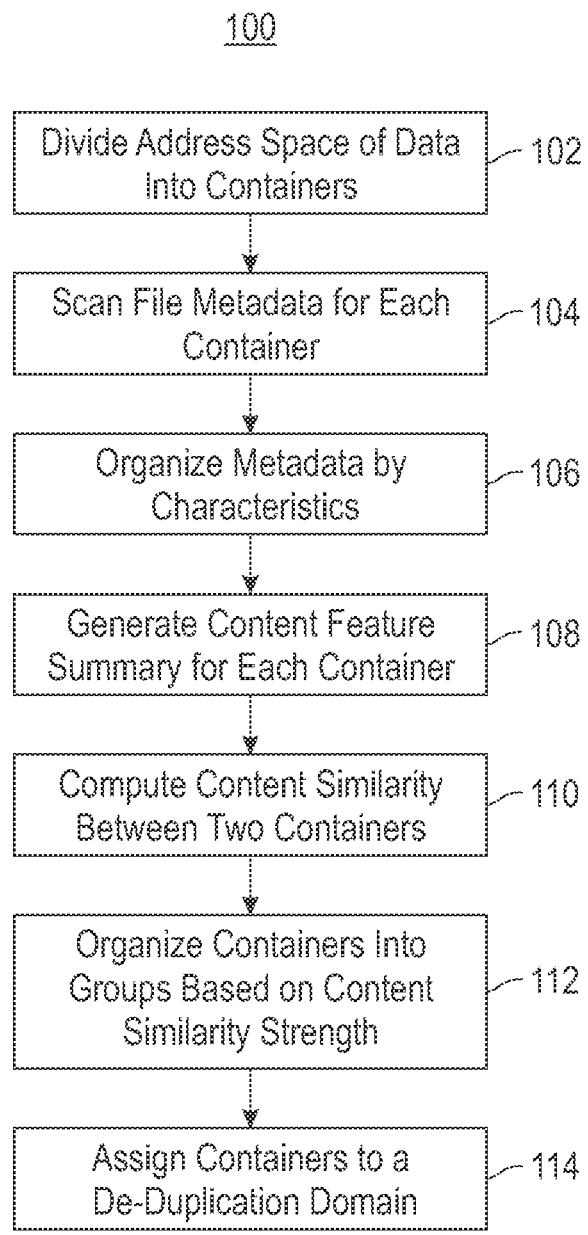
FIG. 1 depicts a flow chart illustrating a method for assigning containers to a de-duplication domain.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Within a data space, duplicate content does not exist as a homogeneous distribution. Rather, duplicate content is often irregularly distributed within the data space such that pockets of the data space may contain a greater proportion of duplicate content. For purposes of efficient de-duplication, it is advantageous to identify such areas of greater duplicate content and to reorganize these areas within a de-duplication domain. A file is a named entity for organizing data, which may contain data and have additional attributes beyond the data it contains at a given time. The name of a file serves to identify it and distinguish it from other files. In one embodiment, the name might provide to the user an indication of the content or usage of the file. A file may by way of non-limiting examples be a document file stored in a computer file system, a folder or subdirectory to contain data files, a web page, an object resident in an object store, a database table, or a row or column in a database table. Additional attributes may include, but are not limited to, a name; one or more types; timestamps of creation, modification, and other operations; access controls that determines who can perform what operations on the contents and which may include ownership information; content tags; access and modification history; performance and usage characteristics; and characteristics associated with current or past contents such as the size of contents, frequencies of different data symbols, language, and application type. The various attributes of a file may be referred to as its metadata and systems for storing files generally include provisions for retrieving the metadata.

FIG. 1 is a flow chart (100) illustrating a method for assigning files to de-duplication domains based on their similarity to one another. File collections with similar attributes may be more likely to have data chunks of identical content and files with no similarity are comparatively unlikely to have many identical data chunks. The address space of possible names for files is divided into sections hereafter known as containers (102). Containers can be individually placed into different de-duplication domains. Placing a container into a de-duplication domain means that the files currently in the container are placed into that domain, and while the container remains in the de-duplication domain the files in it will continue to reside in that domain if their content is changed and future files created in that container will be placed in that domain. Each file among the data is confined to a single container and the files in a container are restricted to a limited number of domains.

A container does not have a fixed limit on the number or total size of files it may contain. However, there may be limits on what a de-duplication domain can contain, and in one embodiment, the containers may be constructed so that the content of each is small enough that more than one container will fit into each domain. In one embodiment the typical size of content in a container is between one-tenth and one-one-thousandth of the typical size of a domain. In one embodiment, the containers may be configured so that each container has a substantial population of files in it when the procedure of assigning file to de-duplication domains is performed, as illustrated in detail in FIG. 1 is performed, so that the estimates of content similarity will be statistically meaningful. In one embodiment, the number of containers is not be too large, so that the computational cost of computing similarity values over pairs is not too large. For example, in one embodiment the total volume of data is between 10 terabytes and 10,000 terabytes and the number of containers is between 100 and 10,000. The number of domains to which the files within a container are confined varies among embodiments. In one embodiment, individual files or subdirectories are assigned to de-duplication domains without restriction, and the grouping into containers can be done in a systematic way based on the file attributes so as to maximize the effectiveness of de-duplication. The effectiveness can in general be improved if files likely to have content similarity are in the same container. For example, defining containers by file type, date of creation, owner, or a combination of these attributes may succeed in placing files with content similarity into the same container. In one embodiment, system constraints delineate indivisible groups of files that must be restricted to a single de-duplication domain, and the containers are constructed such that any indivisible group is placed entirely into one container. Accordingly, files are confined among the containers for placement into a de-duplication domain.

The further steps in the procedure of FIG. 1 provide for determining measurements of similarity between containers based on the attributes of the files they contain. File metadata for each container is scanned to collect the attributes of the files in them (104). One or more categories of attribute are selected to be dimensions used to generate components of the content feature summary. The metadata for each dimension is aggregated into a characterization (106). The characterization for a dimension is a data object that represents the distribution of attribute values from the dimension in a form that permits comparison between containers. In one embodiment the characterization for a select dimension is a histogram of how many files or how many bytes of file content is associated with each of a set of categories for attribute values in the dimension. For example the characterization for the access and ownership dimension may be a histogram of the distribution over owner groups. In one embodiment the characterization for a select dimension is a sampling of attribute values in the dimension. For example the characterization for the file name dimension may be a discrete file summary consisting of a sampling of records each record corresponding to one file.

Once organized, the metadata is utilized to generate a content feature summary for each container (108). Specifically, the content feature summary incorporates the characterizations of the container for each of the attribute dimensions. In one embodiment, the metadata results may be supplemented with selective inspection of file content e.g. to resolve file type uncertainties. In one embodiment, the content feature summary includes statistical distributions of files and file volumes according to criteria associated with content similarity. The statistical distributions may include, but are not limited to, one or more of the following characterizations, distribution of file extensions and file types, distribution of file name characteristics, distribution of file sizes, distribution of owners and owning groups, and distribution of creation times. The distribution for any given dimension is measured and encoded based on one or more of these characterizations. Accordingly, the metadata among containers is utilized to determine content feature summaries of the containers.

Content similarity measurements are computed from one or more of the content feature summaries (110). Content similarity measurements may include, but are not limited to, a discrete-file similarity as depicted and described in FIG. 3, an owner group distribution similarity as depicted and described in FIG. 4, and a type and size distribution similarity as depicted and described in FIG. 5. In one embodiment, each statistical distribution is compared to a like statistical distribution of the same type, and the degree of similarity between the distributions is assessed. A degree of similarity across multiple distributions determines an overall predicted content similarity between containers. Accordingly, the degree of similarity between containers is assessed through content similarity measurements determined from one or more various similarity distributions.

The containers are grouped, or otherwise organized, according to strength of the content similarity (112). In one embodiment, containers that meet a designated threshold of content similarity are grouped together. In one embodiment, the grouping of the containers is restricted by constraints which may include but are not limited to, the number of files, the combined size of the files, the numbers of containers, etc. These constraints may be implemented to maximize the aggregate predicted content similarity across containers in each container group, and/or combined over all groups. In one embodiment, the discrete file similarity values are given a higher priority for grouping than other similarity values. In one embodiment, maximizing the aggregate of discrete file similarity values fully determines the grouping of containers. In such an embodiment, other similarity metrics need not be calculated and/or implemented. In one embodiment, exclusively applying the discrete file similarity values achieves multiple possible groupings and a single grouping solution is achieved through application of the other similarity metrics. In one embodiment, owner group distribution similarity analysis is applied to resolve ambiguity of multiple grouping solutions and where multiple grouping solutions exist subsequent to the distribution similarity analysis, the type and size distribution similarity analysis is applied. Accordingly, containers are compared and a content similarly measurement is utilized to group like containers.

It is recognized that statistical similarity is an imperfect indicator. It is understood that there could be a strong statistical similarity where there is no shared content. However, where a significant quantity of shared content exists, there is a high likelihood of statistical similarity. If the planning method succeeds in placing all containers with strong statistical similarity as a group into the same domain, there is a high likelihood that files with much shared content will be together. If some container groups with strong statistical similarity are split across different domains, some de-duplication benefit might be lost. The expected amount of de-duplication benefit loss rises with the number of similar containers that need to be split. By reducing the number of such container groups that are split across different domains, the statistical-similarity part of the placement method increases the expectation value of de-duplication benefits.

The containers are assigned into de-duplication domains responsive to their grouping (114). In one embodiment, the assignment of files within containers includes grouping containers with high similarity into a common de-duplication domain. In one embodiment, the assignment of containers into a de-duplication domain is determined exclusively by the similarity considerations described above, in addition to the total capacity limit of the de-duplication domain. In another embodiment, additional criteria are applied to the grouped containers for placement consideration. For example, each domain may have limits along multiple dimensions, such as on the total number of operations per second, the total megabytes per second, the total number of containers, and the total volume of data. Various methods for finding acceptable solutions to such multi-dimensional bin packing limitations are known in the art. In one embodiment, the containers are grouped into clusters of an intermediate size between the container size and the maximum size of domains, according to the de-duplication similarity. In this embodiment, the containers with the greatest similarity are placed into like clusters, and the clusters are placed into domains using bin-packing methods. Accordingly, the grouped containers are assigned a de-duplication domain corresponding to their grouping.

Figure 2:
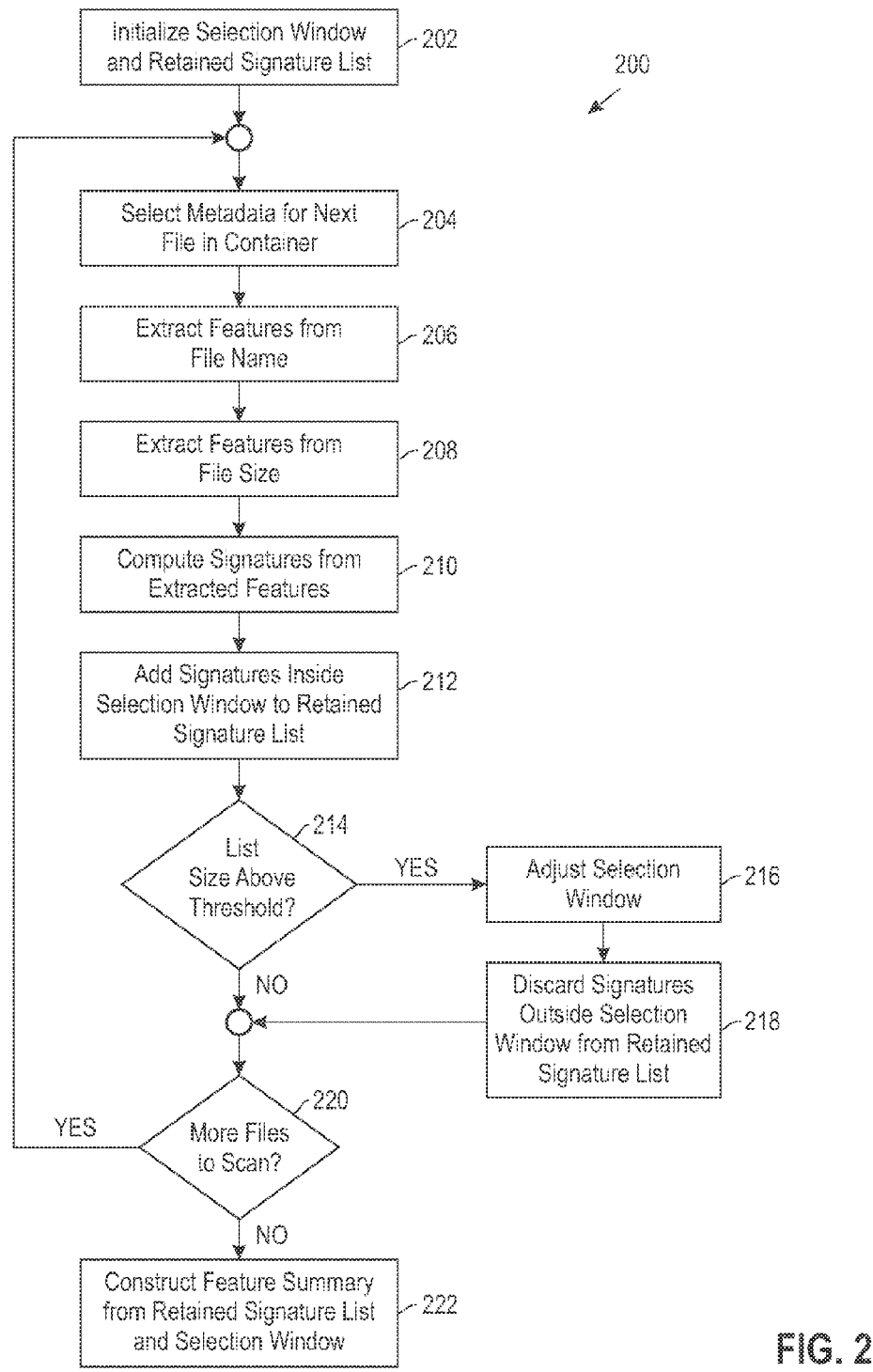
FIG. 2 depicts a flow chart illustrating a method for computing the discrete-file portion of a feature summary.

As shown in step (108), a content feature summary is generated for each container in order to aid in the determination of a content similarity metric. One generated component of the content feature summary is a discrete file summary. The discrete file summary includes a list of records, with each record corresponding to a file. FIG. 2 is a flow chart (200) illustrating a method for computing the discrete-file portion of a feature summary for one container. A selection window is initialized and a retained signature list is initialized as an empty list (202). The selection window is a data element or data structure that defines which of the signature values generated in the process described below are to be held in the retained signature list. Signature values which are designated to be held may be described as being in the selection window. Metadata for a next file within a container is selected (204). Features are extracted from a name of the selected file (206) and also from the size of the selected file (208). In one embodiment, the feature extraction on the name might use a restricted length or apply pattern matching to ignore character strings inserted for distinguishing versions of a file. Accordingly, a file within a container is selected and features are extracted therefrom.

At least one signature is computed from the extracted features (210). A signature is a representation of the features as a data object, with a property that two files with all features identical will also have identical signatures. A signature also has the property that if two files have identical signatures then in most cases their features will be either identical or substantially similar. In one embodiment, the signature contains a numerical value in a fixed range, e.g. 0 to 1, computed from extracted features using a hash function. Hash functions that can be used for this purpose are known to those of ordinary skill in the art and include functions named MD5, SHA-1, and SHA-256. In one embodiment, the signature consists entirely of the contained numerical value. In one embodiment, the selection window is represented as a numerical threshold in the range of possible signature values, with the meaning that signatures whose contained numerical value is numerically less than the threshold are to be held in the retained signature list. If the signature is in the selection window, it is added to the retained signature list (212). In one embodiment, multiple signatures are computed from the extraction of multiple features from a single file and an average factor by which files are over represented is determined and recorded with the feature summary. The number of signatures generated for a file could be increased in proportion to the size of the file e.g. generating one distinct signature for each megabyte of data in the file. In one embodiment, distinct signatures are computed by including an index for the megabyte offset as a feature in the hash calculation. In one embodiment, where multiple features are extracted from a single file, a signature is computed for each extracted feature. In one embodiment, the signatures are computed to the file name and file size. Accordingly, one or more signatures from the extracted feature(s) are computed.

A subset of files is selected for recording in the summary. In one embodiment, the number of files determined for selection is a fixed number, a fixed percentage of files, or some combination thereof. It is therefore determined if the list size is greater than a specified threshold (214). In one embodiment, the threshold is the quantity of files selected for summary recording. A positive response is followed by adjusting the selection window (216). The adjustment generally has the effect of reducing the number of potential signature values contained in the selection window. The adjustment is performed so that any potential signature value which would have been discarded prior to the adjustment will continue to be subject to discard using the selection window following the adjustment. In one embodiment, the adjustment is performed so as to ensure that the selection windows used for different containers have the property of nesting similarity. Nesting similarity means that for any first selection window used for a first container and any second selection window used for a second container, it is true either that all signature values in the second selection window are also in the first selection window, or that all signature values in the first selection window are also in the second selection window. In other words, one selection window is mathematically a subset of the other. In one embodiment, adjustment includes decreasing the value of the numerical threshold, which is one adjustment procedure that ensures nesting similarity. The signatures falling inside the selection window are selected and any signatures falling outside the selection window are discarded from the retained signature list (218).

Following step (218) or a positive response to step (214), it is determined if any additional files remain un-scanned (220). A positive response is followed by a return to step (204), and a negative response is followed by constructing a feature summary from the retained signature list and selection window (222). The feature summary summarizes the contents of the retained signature list. Accordingly, the files to be recorded in the summary are selected and a feature summary containing the selected files is generated.

Figure 3:
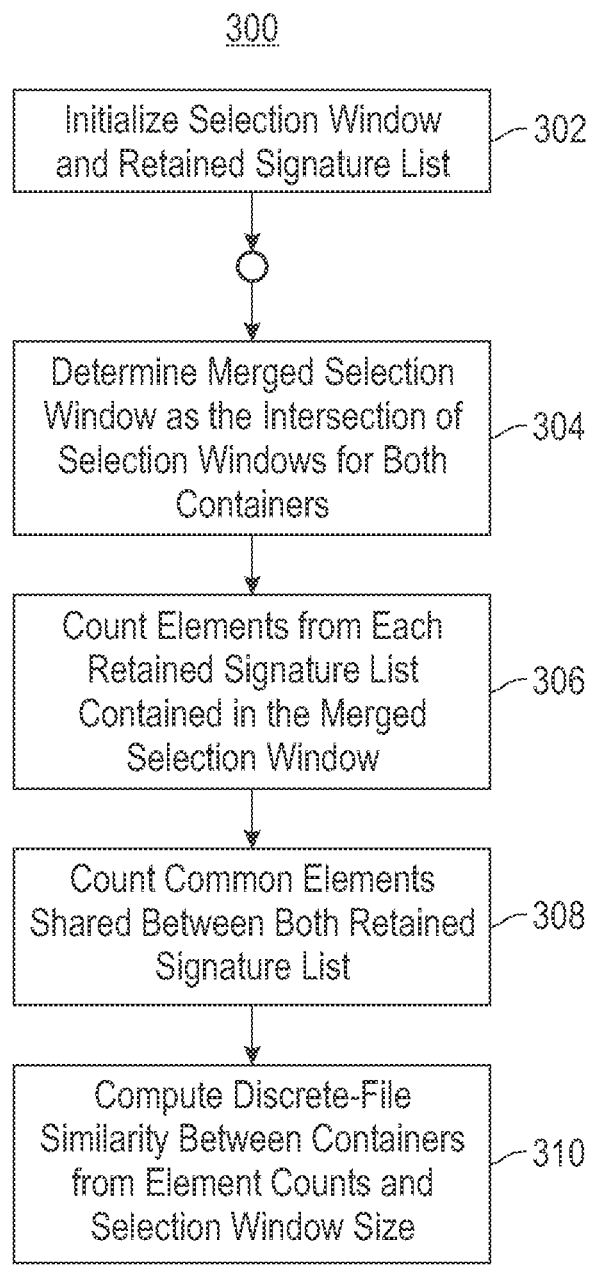
FIG. 3 depicts a flow chart illustrating a method for computing a discrete-file similarity between containers.

Having computed the discrete file portion of the feature summary for each container, a similarity metric between containers can be calculated. FIG. 3 is a flow chart (300) illustrating a method for computing the similarity metric of two containers from the respective discrete file similarities. A selection window and retained signature list are initialized (302). A merged selection window is determined as the intersection of selection windows for both containers (304). Elements from each retained signature list of each of the containers contained in the merged selection window are counted (306). Any element not in the merged selection window does not count toward the totals, so the result is as if each container had been evaluated using the same selection window. In this step the property of nesting similarity is desirable because it minimizes the number of elements that must be thus omitted and therefore yields a better sampling of the container contents. Common elements shared between both of the retained signature lists are also counted (308). The discrete-file similarity between the containers is computed from the element counts and the selection window size (310). In one embodiment, the calculated similarity between the containers is assessed by assigning to each common element individually a score between 0 and 1, where 0 signifies no similarity and 1 signifies a maximum similarity. Accordingly, the common elements between container signature lists are assessed for computation of a similarity metric between the containers.

In one embodiment the similarity score is the total of scores for common elements, divided by the total number of elements from both retained signature lists contained in the merged selection window. That similarity score is a number between 0 and 1 where 1 indicates maximum similarity. Other similarity measurements may be calculated for container grouping. For example, an owner group distribution similarity may be calculated through comparison of owner group distributions of containers. An owner group is a grouping of parties identified for the exchange of sharable content. An example of an owner group may include but is not limited to, a group working on a closely related project, a group sharing media files, a set of computers used for related tasks, a set of computers used when performing related tasks, identified roles that map to related tasks, or network addresses used for supplying or accessing similar content. The parties in the group correspond to an identifier in the file metadata and/or in the attributes of a container.

The set of owner groups is determined through construction of an owner group mapping function which receives as input the metadata for a file and/or attributes of the container and outputs an identifier value for an owner group. In one embodiment, an appropriate owner group mapping function is dependent upon owner identification and access control information used in the file system. In another embodiment, the position in a directory tree is of most importance. In yet another embodiment, the owner group mapping function is a function exclusively of the container, for instance in a backup system where each backup client is a container and the only ownership or access information for a file is its association with a source backup client. Accordingly, a set of owner groups is one or more groups of identified parties determined through construction of an owner group mapping function.

Figure 4:
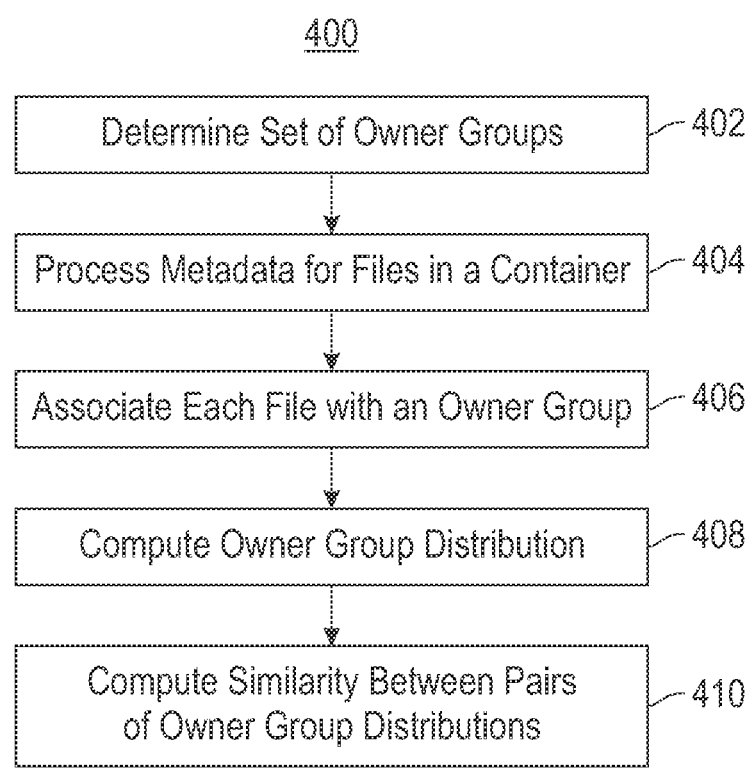
FIG. 4 depicts a flow chart illustrating a method for computing an owner group similarity between containers.

FIG. 4 is a flow chart (400) illustrating a method for computing the similarity between containers through comparing corresponding owner group distributions. The owner group distribution for a container measures how much content of a container is associated with each member of a listed set of owner groups. The set of owner groups is determined (402). In one embodiment, an owner group corresponds to a department within an enterprise identified through financial accounting codes used to manage chargeback for the costs of storing files. The financial accounting codes are available through an administrative tool that provides an association with specific names and/or addresses through which files are accessed. In one embodiment, the set of owner groups are the set of accounting codes. In one embodiment, the set of all accounting codes in use are gathered using automatic or manual clustering methods. In one embodiment, association of each name and/or address point to an associated owner group is tabulated in an owner group mapping function. In one embodiment, the files in the containers are scanned and associated with owner groups through the own owner group mapping function. For example, the name and/or address points are attached to accounting codes and subsequently to owner groups, connecting sub-trees within a file system directory structure. In this instance, all files in the sub-tree are assigned to the associated owner group. Accordingly, a set of owner groups is established and determined for comparison of owner group distributions.

Metadata for files in a container are processed (404). Thereafter, each of the files is associated with an owner group (406). For each owner group, the total number of files in a container associated with the owner group is tallied and the owner group distribution is calculated (408). The similarity between pairs of owner group distributions is assessed as an indicator of similarity between associated containers (410). In one embodiment, the owner group distribution for a container is a collection of values, one for each possible owner group, each value representing a total number of bytes from files in that container associated with that owner group. In one embodiment, the owner group distribution similarity between containers is the sum over all owner groups of overlap bytes within an owner group. Specifically, the overlap bytes for a given owner group is the minimum total bytes between two compared containers associated with the owner group. As an example, a system might have owner groups labeled X, Y and Z, and a container A might contain 500 megabytes (MB) associated with X, 1000 MB associated with Y, and 1500 MB associated with Z, and a second container B might contain 2500 megabytes (MB) associated with X, 1200 MB associated with Y, and 1000 MB associated with Z. The overlap bytes between A and B for owner group X would be 500 MB, for Y would be 1000 MB, and for Z would be 1000 MB, and the sum of overlap bytes would be 2500 MB. In another embodiment, the owner group distribution similarity is the sum of overlap bytes divided by the maximum of the byte content between the two containers. In the foregoing example, the byte content of container A is 3000 MB and the byte content of container B is 3700 MB, so in that embodiment the similarity would be 2500 MB/max(3000 MB, 3700 MB) which is 2500/3700 or the value 0.676. Accordingly, containers are compared through comparison of calculated owner group distributions associated with the containers.

Figure 5:
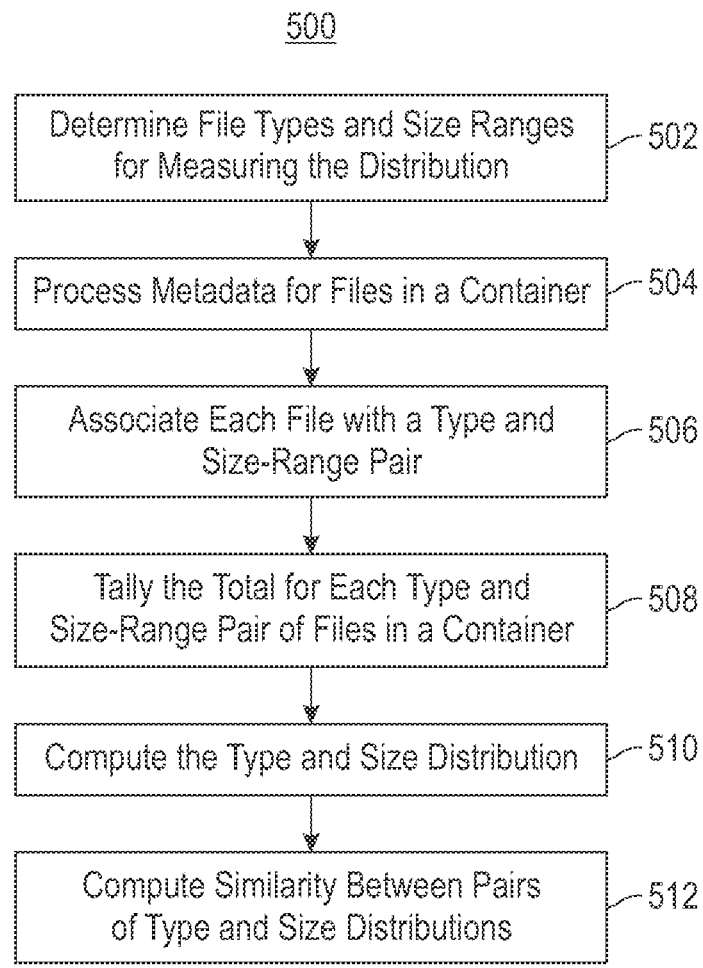
FIG. 5 depicts a flow chart illustrating a method for computing a type and size similarity between containers.

An additional similarity measurement that may be calculated is a similarity measurement between type and size distributions of containers. This similarity measurement is calculated through comparison of the type and file size distribution of two containers and computing a correlation between them. Specifically, the type and size distribution for a container measures how much of the content of the container is associated with each member of a listed set of type and size-range pairs. FIG. 5 is a flow chart (500) illustrating a method for computing the similarity between containers through comparison of corresponding type and size distributions. Initially, file types and size ranges for measuring the distribution are determined (502). In one embodiment, a type of interest is determined by collecting a list of frequently used file extensions or otherwise indicated file types in a collection of files. In one embodiment, rules are manually inputted to group certain types into logical types based on file name pattern matching. For example, inputted rules may group "html", "HTML," "htm", and "HTM" as one logical type. For each type, a set of size ranges is defined. In one embodiment, some or all the file sizes are ignored, a method equivalent to implementing a single size range from zero to the maximum supported size. In another embodiment, size bins are used for a given type. The type and size-range pairs are defined by the list of files and the size bins. Accordingly, a set of type and size range pairs are determined for computing type and size distributions of containers.

The metadata for files in a container are processed (504), and each file is associated with a type and size-range pair (506). For each type and size-range pair, the total number of files in a container associated with the type and size-range pair is tallied (508) and the type and size distribution is calculated (510). The similarity between pairs of type and size distributions is assessed as an indicator of similarity between associated containers (512). In one embodiment, the type and size distribution for a container is the list of absolute numbers tallied, and the similarity between containers is the sum of overlaps on corresponding type and size-range pairs. In one embodiment, the distribution for a container is the percentage per type and size-range pair obtained by normalizing the absolute numbers, and the similarity is a correlation between the number lists. Accordingly, containers are compared through comparison of calculated type and size-range pair distributions associated with the containers.

Additional file attributes may be used to determine additional elements of the content feature summary and then to determine similarity values between containers. File attributes useful for this purpose might include labels that denote aspects such as the language represented in a file, the usage type for a file, the distribution of symbols used in a file, and the compressibility of the file's content. File attributes used in this way might be stored within file system metadata, in extended attributes stored by the file system, or in separate tables or databases. The feature summary may consist of a distribution of how many files or how much content is associated with each of a number of label values.

Figure 6:
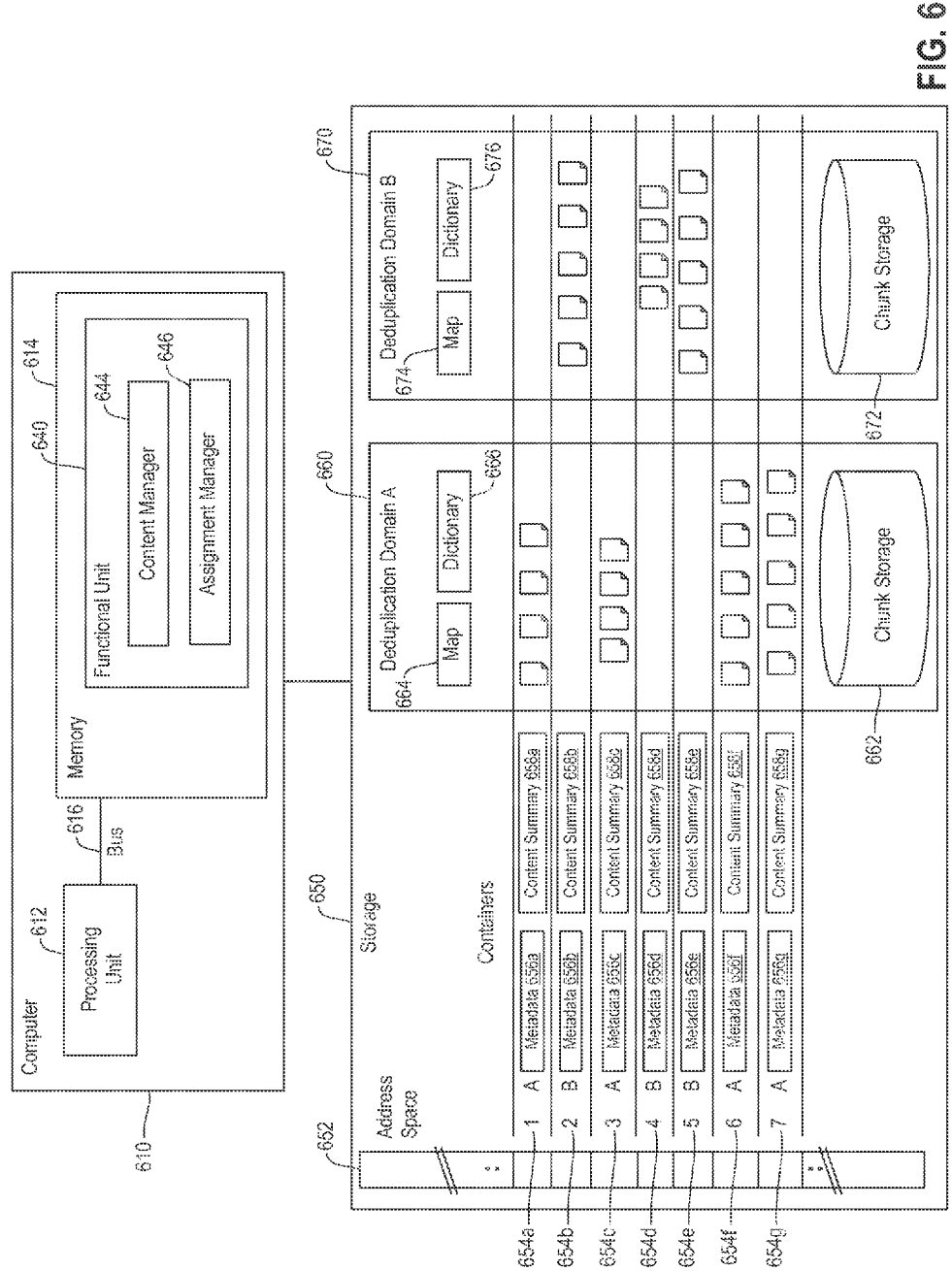
FIG. 6 depicts a block diagram depicting a system for assignment of containers to a de-duplication domain.

The processes shown in FIGS. 1-5 may be embodied as hardware components. FIG. 6 is a block diagram (600) illustrating tools embedded in a computer system to support assignment of files to a de-duplication domain. As shown, the system includes a computer (610) provided with a processing unit (612) in communication with memory (614) across a bus (616). Data storage (650) is provided in local communication with the computer (610) to store received or generated data. In one embodiment the data storage (640) may be remote with access to the storage provided across a network (605).

The computer (610) includes a functional unit (640) having one or more tools to support the functionality of the containers with respect to data de-duplication. The tools embedded in the functional unit (640) include, but are not limited to a content manager (644) and an assignment manager (646). In the embodiment illustrated, the data being analyzed already is resident in storage which is capable of performing de-duplication. The address space (652) of the storage (650) is subdivided into containers (654). In this example, there are seven containers (654a), (654b), (654c), (654d), (654e), (654f), and (654g), although the quantity shown herein should not be considered limiting. Each container is capable of being associated with one de-duplication domain. The storage (650) is shown with two de-duplication domains (660) and (670), although the quantity shown herein should not be considered limiting. As shown, each container has already been associated with a de-duplication domain, hereinafter referred to as domain, either (660) or (670). When a container is associated with a domain, the file content for its files is stored by the operation of that domain, with reference to the chunks held in the chunk storage for that domain. In one embodiment, there might be containers in data storage (650) that are not associated with a de-duplication domain, and the files for such a container are stored elsewhere in the storage.

When a file is to be accessed for reading or writing, the operation is directed for service to the de-duplication domain to which the file is assigned if there is one, and elsewhere in the storage otherwise. In some embodiments, the assigned de-duplication domain is identified by finding the file's location in the address space, identifying the associated container, and identifying the domain associated with the container. In some embodiments the possible operations include creation of a new file in the associated de-duplication domain.

Associated with the files contained in any container, whether associated with a de-duplication domain or not, is the metadata for those files and a content summary. As shown, container (654a) is associated with metadata (656a) and content summary (658a), container (654b) is associated with metadata (656b) and content summary (658b), container (654c) is associated with metadata (656c) and content summary (658c), container (654d) is associated with metadata (656d) and content summary (658d), container (654e) is associated with metadata (656e) and content summary (658e), container (654f) is associated with metadata (656f) and content summary (658f), and container (654g) is associated with metadata (656g) and content summary (658g). The metadata is generally maintained in memory or on persistent storage, subject to continual update as the file content is changed. The content summary is generated by operation of the content manager (644) with reference to the metadata according to the procedures described in FIGS. 1-5. In some embodiments, the content summaries are newly generated whenever the assignment manager (646) is called upon to make assignment decisions, and they are discarded after that use. In other embodiments, the content summaries are retained after they have been used to make an assignment decision, to be used as input to the content manager (644) when it is called upon to make new content summaries after the content of files in containers has changed. It is possible for a container to exist and to contain files for an extended time before any content summary is generated for it.

FIG. 6 depicts an embodiment in which containers are long-lived entities that reside in the storage 650. In other embodiments the containers are created whenever the assignment manager (646) is called upon to make assignment decisions, and are discarded after the decisions are made and the assignments of files to domains has been performed. In some such embodiments the assignment of files includes provisions for newly created files to be assigned to domains, for example by inheriting the assignment applicable to a parent directory.

Each de-duplication domain (660) and (670) comprises a chunk storage (662), (672); a map (664), (674) that provides, for each file in the domain, the locations in the chunk storage of the chunks that make up the file; and a dictionary (666), (676) that provides the locations of chunks indexed by their content fingerprints. A domain may also comprise its own processing unit, memory, and physical data storage devices, although in some embodiments it might also share processing units, memory, and physical data storage devices with other domains.

As described below, the content manager (644) and the assignment manager (646) perform actions as described with reference to FIGS. 1-5 to associate containers with specific de-duplication domains, and as a result to assign the files from a container to the domain associated with the container. This may be done in different situations. One situation is the deployment of data into a de-duplicating system. In this situation, the containers are defined and none of them has an association with a domain, so the files are not assigned to domains. By the operation of the procedures of the invention, some or all of the containers are assigned to domains, and their files likewise are assigned, so that the benefits of de-duplication may be realized.

A second situation is the re-assignment of containers. In this situation, some or all containers are initially associated with domains. Then by the operation of the invention, new associations are selected for some containers, associating some containers with domains different from the initial association, and the new association leads to an increase in the de-duplication benefits. A re-assignment may be warranted if the file content in containers has changed, or if the number or capacity of domains has changed. A third situation is a re-definition of containers. In this situation the boundaries between containers are re-drawn, for example because some have so much content that they would better be managed as separate parts, and because others have so little content that they should be coalesced into a smaller number of containers. When a new set of containers is formulated, it may happen that some new containers have files all assigned to the same domain so that it is valid to consider the container as associated with that domain, and it may happen that other new containers have files assigned across multiple domains so that the container has no association to one domain. It is possible to obtain the metadata of each container, of either type, construct the content summaries, and select new associations of containers to domains according to the procedures of the invention.

In one embodiment, each container is associated with a commonality of usage of data. For example, in one embodiment, different users may have different containers. The tools in the form of the content manager (644) and the assignment manager (646) function to deploy de-duplication of data. Specifically, the content manager (644) performs a scan of file metadata of each container, and from the scan generates the content feature summary for each container, as shown and described above. Based on the content feature summary, the content manager (644) measures content similarity, an in one embodiment, a similarity prediction measurement, between the containers. The assignment manager (646) functions to assign files from each container to one of the de-duplication domains (660) and (680) based on the computed content similarity.

The content manager (644) employs the processing unit (612) to support assessment of data in the form of the measurements, so that assignment of data to a specific de-duplication domains mitigates retention of duplicate data. As described above in FIGS. 1-4, computations are performed to support the de-duplication. The content manager (644) employs the processing unit (612) to support the process and analysis associated with the data de-duplication. More specifically, as described above in FIGS. 2 and 3, file similarities are assessed among the containers. The content manager (644) employs the processing unit (612) to estimate a discrete file similarity through one or more file summaries, with each file summary having a list of records corresponding to a file, and each record having a signature computed from a file name and file size. Furthermore, as described above in FIG. 4, a set of owner groups and similarity among the owners groups are assessed. The content manager (644) employs the processing unit (612) to compute an owner group distribution similarity and to compute a correlation between the groups. The computation of the owner group distribution similarity includes comparison of owner group distribution of containers and assessment of a correlation between the groups. Similarly, the identification of one or more sets of owner groups includes the content manager (644) to process metadata for files in the container, associated each file with at least one owner group, and to compute the owner group distribution.

Another functionality supported by the content manager (644) is described in FIG. 5 in detail, and pertains to the assessment of similarity between pairs of type and size distribution of files in the containers. Specifically, the content manager (644) as supported by the processing unit (612), computes type and size distributions of files within containers, compares the distributions between the containers, and computes a similarity between containers based on the comparison. The type and size distribution of each container is a measurement of how much content within the container is associated with each member of a listed set of type and size-range pairs. All of the computations supported by the content manager (644) function to enable the assignment manager (646) to place containers with high similarity into a common de-duplication domain. Accordingly, data among the de-duplication domains and their respective containers are placed based on their assessed similarities.

As identified above, the content manager (644) and the assignment manager (646) are shown residing in the functional unit (640) of the computer (610). Although in one embodiment, the functional unit (640) and the managers (644) and (646), respectively, may reside as hardware tools external to memory (614). In another embodiment, the managers (644) and (646), respectively, may be implemented as a combination of hardware and software in a shared pool of resources. Similarly, in one embodiment, the managers (644)-(646) may be combined into a single functional item that incorporates the functionality of the separate items. As shown herein, each of the managers (644)-(646) are shown local to one computer system (610). However, in one embodiment they may be collectively or individually distributed across a shared pool of configurable computer resources and function as a unit to support data de-duplication. The managers (644) and (646) are shown local to the computer (610) in communication with storage (650). In one embodiment, the managers may be incorporated into the data storage (650). As indicated above, storage (650) may be configured as a separate semi-autonomous unit for performing data storage and incorporating a processing unit and memory, and may be configured with the managers (644) and (646) embedded or in communication with the incorporated processing unit and memory. Similarly, in one embodiment, each of the de-duplication domains (660) and (670) may be configured with a separate processing unit and/or memory. Accordingly, the managers may be implemented as software tools, hardware tools, or a combination of software and hardware tools.

Furthermore, the described features, structures, or characteristics may be combined in any suitable manner in one or more embodiments. Examples of the managers have been provided to lend a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The functional unit(s) described above in FIG. 6 has been labeled with managers. The managers may be implemented in programmable hardware devices such as field programmable gate arrays, programmable array logic, programmable logic devices, or the like. The manager(s) may also be implemented in software for processing by various types of processors. An identified manager of executable code may, for instance, comprise one or more physical or logical blocks of computer instructions which may, for instance, be organized as an object, procedure, function, or other construct. Nevertheless, the executable of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Figure 7:
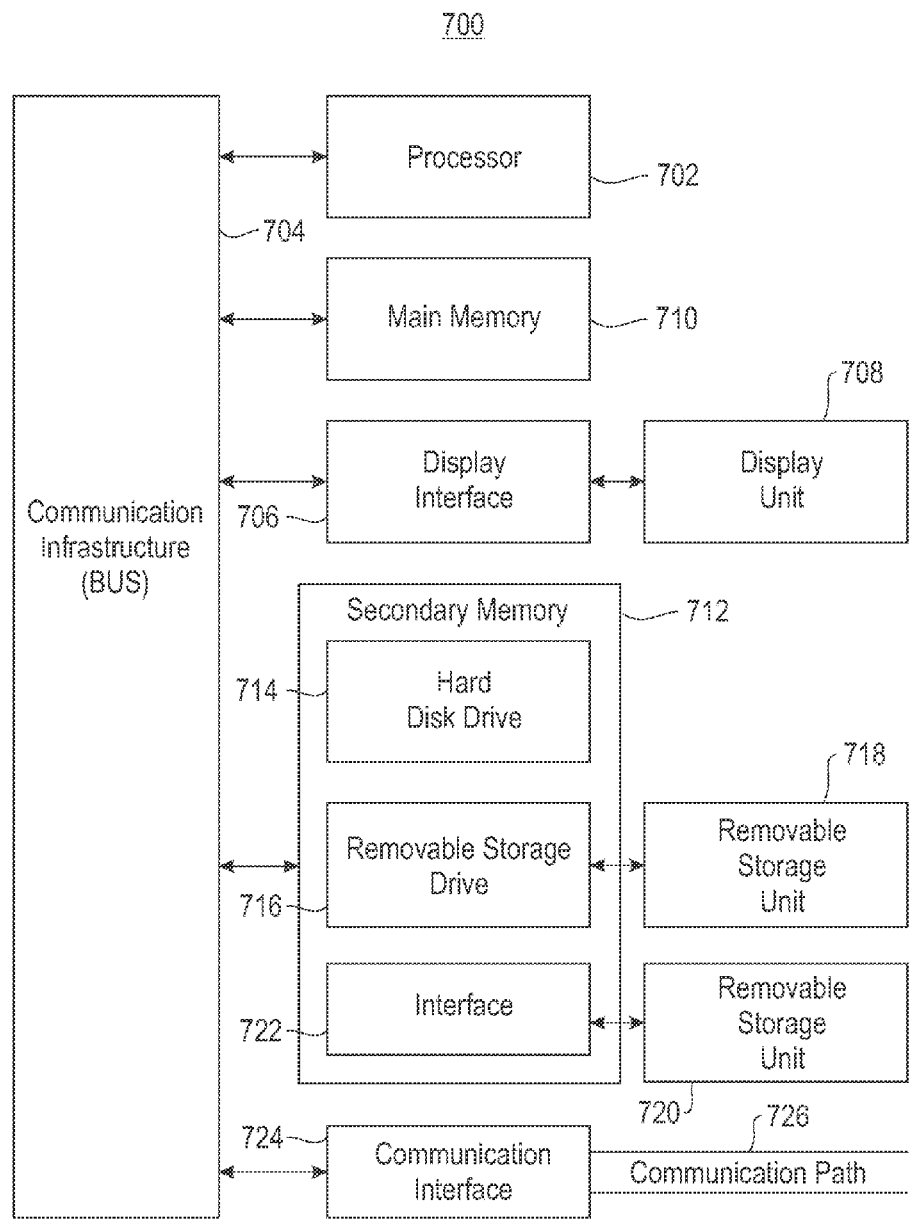
FIG. 7 depicts a block diagram showing a system for implementing an embodiment of the present invention.

Referring now to the block diagram of FIG. 7, additional details are now described with respect to implementing an embodiment of the present invention. The computer system includes one or more processors, such as a processor (702). The processor (702) is connected to a communication infrastructure (704) (e.g., a communications bus, cross-over bar, or network).

The computer system can include a display interface (706) that forwards graphics, text, and other data from the communication infrastructure (704) (or from a frame buffer not shown) for display on a display unit (708). The computer system also includes a main memory (710), preferably random access memory (RAM), and may also include a secondary memory (712). The secondary memory (712) may include, for example, a hard disk drive (714) and/or a removable storage drive (716), representing, for example, a floppy disk drive, a magnetic tape drive, or an optical disk drive. The removable storage drive (716) reads from and/or writes to a removable storage unit (718) in a manner well known to those having ordinary skill in the art. Removable storage unit (718) represents, for example, a floppy disk, a compact disc, a magnetic tape, or an optical disk, etc., which is read by and written to by removable storage drive (716). As will be appreciated, the removable storage unit (718) includes a computer readable medium having stored therein computer software and/or data.

In alternative embodiments, the secondary memory (712) may include other similar means for allowing computer programs or other instructions to be loaded into the computer system. Such means may include, for example, a removable storage unit (720) and an interface (722). Examples of such means may include a program package and package interface (such as that found in video game devices), a removable memory chip (such as an EPROM, or PROM) and associated socket, and other removable storage units (720) and interfaces (722) which allow software and data to be transferred from the removable storage unit (720) to the computer system.

The computer system may also include a communications interface (724). Communications interface (724) allows software and data to be transferred between the computer system and external devices. Examples of communications interface (724) may include a modem, a network interface (such as an Ethernet card), a communications port, or a PCMCIA slot and card, etc. Software and data transferred via communications interface (724) is in the form of signals which may be, for example, electronic, electromagnetic, optical, or other signals capable of being received by communications interface (724). These signals are provided to communications interface (724) via a communications path (i.e., channel) (726). This communications path (726) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (710) and secondary memory (712), removable storage drive (716), and a hard disk installed in hard disk drive (714).

Computer programs (also called computer control logic) are stored in main memory (710) and/or secondary memory (712). Computer programs may also be received via a communication interface (724). Such computer programs, when run, enable the computer system to perform the features of the present invention as discussed herein. In particular, the computer programs, when run, enable the processor (702) to perform the features of the computer system. Accordingly, such computer programs represent controllers of the computer system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the code stream compression supports flexibility with respect to decompression, including, decompression of the code stream from an arbitrary position therein, with the decompression being a recursive process to the underlying literal of a referenced phrase.

Alternative Embodiment

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A computer program product for deploying de-duplication, the computer program product comprising a computer readable program storage device having program code embodied therewith, the program code executable by a processor to:

divide files corresponding to an address space into multiple containers;

perform a file metadata scan, including obtaining attributes for files in each container;

aggregate the file attributes into characterizations for each attribute dimension and generate a content feature summary for each container based on a selection window and a signature list, wherein the content feature summary incorporates the characterizations and summarizes the signature list, wherein generating the content feature summary comprises program code to compute one or more discrete file summaries, and wherein computing a discrete file summary comprises program code to:

initialize the signature list;

select a file from a subset of files within one of the containers, and extract features from one or more attributes of the selected file;

compute a signature from the one or more extracted features, wherein the signature comprises a numerical value; and add the signature to the signature list in response to the numerical value being less than a first threshold associated with the selection window;

measure a content similarity prediction measurement between containers from the generated content feature summary; and assign files from each container to a de-duplication domain based on the computed content similarity prediction measurement.

2. The computer program product of claim 1, wherein the file attributes include file system metadata.

3. The computer program product of claim 2, further comprising program code to estimate a discrete file similarity through use of the one or more discrete file summaries, each discrete file summary including a list of records, each record corresponding to one file, and each signature being computed from a file name and a file size.

4. The computer program product of claim 2, wherein the content similarity prediction measurement comprises an owner group distribution similarity, and wherein the measurement of the owner group distribution similarity comprises program code to compute the owner group distribution similarity, including program code to compare owner group distributions for two or more containers, and compute a correlation between the groups based on the comparison.

5. The computer program product of claim 4, wherein the computation of the owner group distribution similarity further comprises program code to determine a set of owner groups, process metadata for files in a container, associate each file with one of the owner groups, and compute an owner group distribution.

6. The computer program product of claim 2, wherein the measurement of the content similarity prediction measurement comprises program code to compute type and size distributions within the containers, compare the distributions between the containers, and compute a similarity between containers based on the comparison.

7. The computer program product of claim 6, wherein the type and size distribution of a container measures a quantity of content within the container associated with each member of a listed set of type and size-range pairs.

8. The computer program product of claim 1, wherein the assignment of files comprises program code to place containers with high similarity into a common de-duplication domain.

9. A system comprising:
a processing unit in communication with memory, and data storage having files corresponding to an address space divided into containers;

one or more tools in communication with the processing unit, the tools to deploy de-duplication within the address space, including the tools to:

perform a metadata scan to obtain attributes for files in each container;

aggregate the file attributes into characterizations for each attribute dimension and generate a content feature summary for each container based on a selection window and a signature list, wherein the content feature summary incorporates the characterizations and summarizes the signature list, wherein generating the content feature summary comprises the one or more tools to compute one or more discrete file summaries, and wherein computing a discrete file summary comprises the tools to:

initialize the signature list;

select a file from a subset of files within one or more of the containers, and extracting features from one or more attributes of the selected file;

compute a signature from the one or more extracted features, wherein the signature comprises a numerical value; and add the signature to the signature list in response to the numerical value being less than the first threshold associated with the selection window;

measure a content similarity prediction measurement between the containers from the generated content feature summary; and assign files from each container to a de-duplication domain based on the computed content similarity prediction measurement.

10. The system of claim 9, further comprising the one or more tools to estimate a discrete file similarity through use of the one or more discrete file summaries, each discrete file summary including a list of records, each record corresponding to one file, and each signature being computed from a file name and a file size.

11. The system of claim 9, wherein the content similarity prediction measurement comprises an owner group distribution similarity, and wherein the measurement of the owner group distribution similarity comprises the one or more tools to compute the owner group distribution similarity, including the one or more tools to compare owner group distributions for two or more containers, and compute a correlation between the groups based on the comparison.

12. The system of claim 11, wherein the computation of the owner group distribution similarity further comprises the one or more tools to determine a set of owner groups, process metadata for files in a container, associate each file with one of the owner groups, and compute an owner group distribution.

13. The system of claim 9, wherein the measurement of the content similarity prediction measurement comprises the one or more tools to compute type and size distributions within the containers, compare the distributions between the containers, and compute a similarity between the containers based on the comparison, wherein the type and size distribution of a container measures a quantity of content within the container associated with each member of a listed set of type and size-range pairs.

14. The computer program product of claim 1, further comprising program code to generate a statistical distribution of each obtained attribute across the plurality of files in each container, and wherein the measurement of the content similarity prediction measurement includes program code to compare statistical distributions between containers.

15. The system of claim 9, further comprising the one or more tools to generate a statistical distribution of each obtained attribute across the plurality of files in each container, and wherein the measurement of the content similarity prediction measurement includes the one or more tools to compare statistical distributions between containers.

16. The computer program product of claim 1, wherein computing the signatures comprises program code to apply a hash function to the extracted features.

17. The system of claim 9, wherein computing the signatures comprises the one or more tools to apply a hash function to the extracted features.

18. The computer program product of claim 1, wherein generating the content feature summary further comprises program code to:
- select a second threshold associated with a quantity of files selected, the second threshold being selected from the group consisting of: a fixed number of files, a fixed percentage of files, or a combination thereof;
- adjust the selection window in response to a size of the signature list exceeding the second threshold, including decreasing the value of the first threshold; and
- remove, from the signature list, each signature comprising a numerical value exceeding the first threshold.

19. The system of claim 9, wherein generating the content feature summary further comprises the one or more tools to:
- select a second threshold associated with a quantity of files selected, the second threshold being selected from the group consisting of: a fixed number of files, a fixed percentage of files, or a combination thereof;
- adjust the selection window in response to a size of the signature list exceeding the second threshold, including decreasing the value of the first threshold; and
- remove, from the signature list, each signature comprising a numerical value exceeding the first threshold.

20. The system of claim 9, wherein the assignment of files comprises the one or more tools to place containers with high similarity into a common de-duplication domain.

* * * * *